United States Patent [19]

Funabashi et al.

[11] Patent Number: 4,608,918

[45] Date of Patent: Sep. 2, 1986

[54] APPARATUS FOR MANUFACTURING SEALED SANDWICH STYLE BUNS

[76] Inventors: Takeshi Funabashi, 20-9, Nanzancho; Shigeaki Funabashi, 55 Umezono, Hirojicho, both of Showa-ku, Nagoya-shi, Japan

[21] Appl. No.: 691,657

[22] Filed: Jan. 15, 1985

[51] Int. Cl.[4] ............................................. A21C 15/04
[52] U.S. Cl. ................................... 99/450.4; 99/450.6; 99/450.7
[58] Field of Search ................. 99/450.1, 450.4, 450.5, 99/450.6, 450.7, 494; 425/444

[56] References Cited

U.S. PATENT DOCUMENTS 3,782,270 1/1974 Sollerud ............................. 99/450.4
4,202,260 5/1980 Weger ................................ 99/450.4

Primary Examiner—Timothy F. Simone
Attorney, Agent, or Firm—David H. Semmes; Warren E. Olsen

[57] ABSTRACT

The present invention is directed to an apparatus, for manufacturing sealed sandwich style buns, which can cut off crusts on outer peripheries of each two sliced breads containing jam, cheese, meat, vegetable or the like therebetween at one operation and can simultaneously press the outer peripheries of the sliced breads to seal them.

4 Claims, 5 Drawing Figures

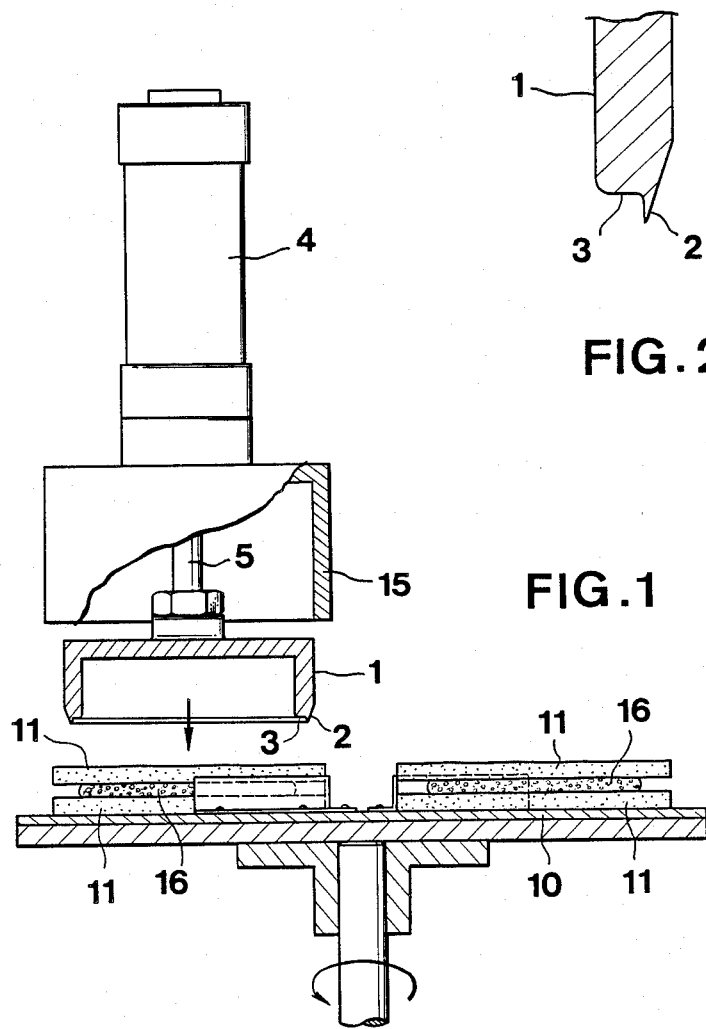

APPARATUS FOR MANUFACTURING SEALED SANDWICH STYLE BUNS

BACKGROUND OF THE INVENTION (1) Field of the Invention

The present invention relates to an apparatus for manufacturing sealed sandwich style buns.

(2) Description of the Prior Art

As for conventional sandwiches, their peripheries are in an open state. In other words, a cooked material is only put between two sliced breads. In the case of such a kind of sandwich, the cooked material easily goes bad and is not preservable. Even if the cooked material can be preserved, it will grow hard. When the cooked material has become hard, the sandwich containing it is required to be toasted by a toaster or to be warmed by a steamer. At this time, the cooked material would flow out or fall from between the two sliced breads, so that a shape inherent in the sandwich would be worsened and its taste would be impaired disadvantageously. Further, in the case of the conventional sandwiches the outer peripheries of which are open, crusts on the four sides of the sliced breads have been removed by cutting a number of sliced breads vertically heaped up at once with a disc-like rotary blade one side at a time. Therefore, in order to remove the crusts on the four sides of each sandwich, the cutting operation has been required as many as four times.

SUMMARY OF THE INVENTION

An object of the present invention is to provide an apparatus for manufacturing sealed sandwich style buns which is capable of overcoming the above-mentioned drawbacks, and this apparatus comprises a cutting device, for cutting off crusts of sliced breads, which has a frame like sharp blade on the top of its outer periphery and a shoulder having a predetermined width on the inside wall of the frame-like blade, and an intermittently rotatable table which is disposed under the cutting device and on which sandwiches each consisting of two sliced breads and jam, cheese, meat or vegetable lying therebetween can be put, the cutting device having functions of cutting off the crusts on the four sides of each sandwich in a pressing manner at one operation by the use of the frame-like blade and simultaneously causing outer peripheries of the sandwich to adhere to each other by the pressing of the shoulder and to thereby seal the two sliced breads.

The apparatus of the present invention does not employ a manner of cutting off the crusts on the four sides of many sliced breads heaped up at four operations as in the conventional technique. According to the apparatus of the present invention, the crusts on the four sides of the two sliced breads can instead be cut off at one operation and the peripheral four sides of the breads can be simultaneously sealed to confine a sandwiched material within the two sliced breads. That is to say, the apparatus of the present invention permits cutting off, at one operation, the crusts on the four sides of the two sliced breads between which jam, cheese, meat or vegetable is sandwiched and which constitute the sandwich, and simultaneously sealing the peripheral four sides thereof.

BRIEF DESCRIPTION OF THE DRAWINGS

The drawings show an embodiment of the present invention.

FIG. 1 is a side view schematically illustrating an apparatus for cutting off crusts of sliced breads and simultaneously sealing their peripheries;

FIG. 2 is a partially enlarged view of a cutting blade;

DETAILED DESCRIPTION OF THE INVENTION

Figure 3:
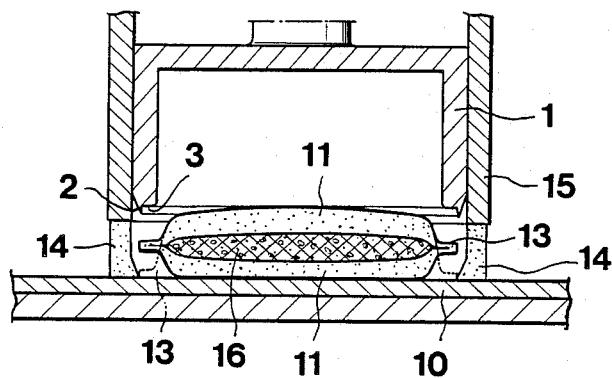
FIG. 3 is a partially enlarged view illustrating a cut and sealed sandwich in the apparatus.
Figure 4:
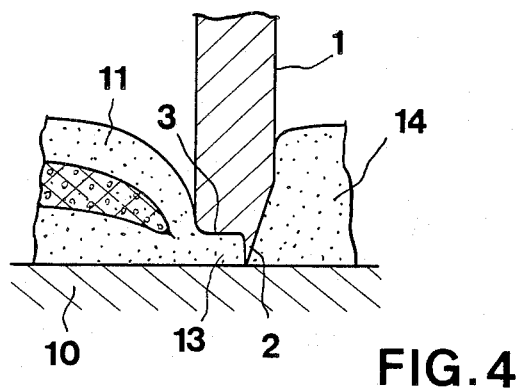
FIG. 4 is a partially enlarged view illustrating a scene in which sliced breads are cut and sealed.

According to an apparatus of the present invention, as shown in FIG. 1, a cutting blade 1 having a sharp frame-like blade provided on the top of its outer periphery is caused to descend in a pressing manner in order to cut off, at one time and in the form of a square frame, crusts on four peripheral sides of sliced breads 11, 11 containing a cooked material 16 therebetween which are put on a table 10 made from hard urethane rubber, and simultaneously to seal the four outer peripheral sides of the sliced breads.

If the tetragonal shape of the cutting blade 1 is changed to another shape such as a flower or animal, sandwich style buns having such a shape in which their outer peripheries are sealed without any crusts can be manufactured.

As shown in FIG. 2, the frame-like cutting blade 1 regarding the present invention is provided, on its top end, with a sharp frame-like blade 2 and, on its inside wall, with a shoulder 3 having a predetermined width. The cutting blade 1 is fixed under a piston 5 which can move upward and downward within a cylinder 4, whereby the cutting blade 1 can thus move in up and down directions. The above-mentioned intermittently rotatable table 10 is disposed under the cutting blade 1, with the center of the cylinder 4 deviated from the center of the table 10. The sliced bread 11 put on one said (right side in FIG. 1) of the table 10 is delivered to a position under the cutting blade 1 by rotating the table 10 as much as half a rotation and is stopped there. At this time, the cutting blade 1 is caused to descend in a pressing manner in order to cut off the crusts on the four sides of the sliced breads at one operation and to simultaneously seal them, while new sliced breads 11 are put on the right side of the table 10 shown in FIG. 1. When the cutting blade 1 is caused to ascend after the cutting and sealing, half the rotation of the table 10 is carried out again, and it is stopped, and the crusts of the sliced breads are cut off and the breads are sealed simultaneously. Afterward, the same procedure is repeated to cut off the crusts on the four sides of the sliced breads and to seal the breads continuously.

In order to manufacture sandwich style buns or cooked breads by the utilization of the cutting blade 1 in accordance with the present invention, the shoulder 3 having a predermined width is provided on the inside wall of the frame-like blade 2. When the cutting device 1 is caused to descend, the shoulder 3 presses the outer peripheries of the sliced breads. At this time, the outer peripheries of the breads are temporarily pressed by the shoulder 3 as represented in phantom, but when the cutting blade 1 is caused to ascend, the pressed peripheries take a configuration of such a pressed portion 13 as represented by a solid line, and the four outer peripheries of the sliced breads are additionally sealed.

When the cutting blade 1 is raised, the crusts which have been cut in the form of the rectangular frame are lifted together sometimes because of its adhesion to the blade 1. Such a problem can be prevented by virtue of a scraper 15 upward and downward movably provided on an outer periphery of the cutting blade 1. Further, it seems probable that the sandwich rises together with the cutting blade 1 due to the adhesion of the sandwich to the inside wall of the cutting blade 1, but if this adhesion is strong, a press plate (not shown) which has the same function as the scraper 15 may be provided at the center of the frame-like cutting blade 1.

The sandwich which its crusts have been removed and its four outer peripheries are sealed by the above-mentioned apparatus may be fried in oil, or may thereafter be coated with viscous chocolate, peanut or the like to manufacture buns.

According to the apparatus of the present invention, the two sliced breads are punched by the cutting blade 1 in accordance with the above-mentioned procedure in order to cut off the crusts of the sliced breads and to simultaneously seal the outer peripheries of the breads, while a food 16 such as bean jam, jam, cheese, meat or vegetable is sandwiched between the two sliced breads, thereby manufacturing a sandwich style bun 17 containing each food 16 therein.

In contrast to the conventional sandwiches the outer peripheries of which are not sealed, the buns 17 manufactured by the apparatus of the present invention do not allow mayonnaise, tomato catsup or the like to flow out, therefore they are easy to eat and to hold by hand, and do not soil hands.

Figure 5:
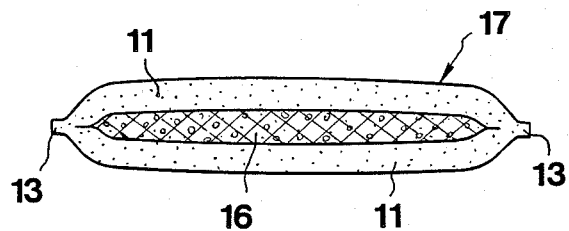
FIG. 5 is a vertical section of a sandwich style bun.

The inventors of the present application actually manufactured a bun in an embodiment using the apparatus of the present invention. The used cutting blade 1 had the shoulder 3 of about 3 mm in width, the distance from an edge of the blade to the shoulder being about 1 mm. A sliced cheese was sandwiched between two sliced breads each having a thickness of 1 cm, and crusts of the breads were cut off by means of the cutting blade 1. As a result, there could be manufactured a sandwich style bun the pressed portion 13 on the outer periphery of which was sealed by an adhesive force of the sliced breads themselves so tightly as not to be easily separated, as shown in FIG. 5.

As understood from the foregoing, the present invention makes use of the frame-like cutting blade 1 and permits cutting off the crusts on the peripheries of the sliced breads and simultaneously sealing the outer peripheries of the sliced breads at one operation in the same manner as the punching of a press, therefore the procedure of the manufacture process can be more simplified than the conventional technique. Further, the cut portions of the sliced breads are pressed and sealed, therefore the production and fall of crumbs can be restrained. Moreover, if the cutting blades having a variety of shapes are employed as mentioned above, the sandwich style buns having shapes such as flowers and animals can be manufactured. From the viewpoints just described, it can be concluded that the apparatus of the present invention is useful and valuable in industrial fields.

What is claimed is:

1. Apparatus for manufacturing sealed sandwich style buns of the type embodying opposed slices of bread enclosing an inner filling, comprising:
   (a) a reciprocating cylinder;
   (b) a cutting device attached to said cylinder for cutting off crusts of sliced bread, further including:
      (i) a sharp blade in the form of a peripheral frame, and
      (ii) an inner shoulder extending inwardly of said blade so as to engage the periphery of a sandwich being cut; and
   (c) a rotatable table positioned beneath said cutting device, such that one-half of the table is disposed beneath said cutting device at any one time;
   said cutting device upon reciprocation against a sandwich supported upon said table being adapted to simultaneously cut off the crusts on the four sides of the sandwich, while said inner shoulder presses the peripheries of the sandwich to seal together the opposed slices of bread.

2. Apparatus for manufacturing sealed sandwich style buns as in claim 1, wherein said peripheral cutting blade is configured convolutely.

3. Apparatus for manufacturing sealed sandwich style buns as in claim 1 wherein said rotatable table is adapted to support a sandwich in each half.

4. Apparatus for sealing sandwich style buns as in claim 3, further including:
   (d) a scraper attached to said cylinder and reciprocable with said sharp blade so as to abut said crusts of sliced bread and disengage said crusts from said sharp blade.

* * * * *